United States Patent [19]
Stein

[11] Patent Number: 5,901,660
[45] Date of Patent: May 11, 1999

[54] COMMUNICATIONS SYSTEM FOR MONITORING THE PRESENCE OF ANIMALS IN A NATURAL FEEDING ENVIRONMENT

[75] Inventor: John W. Stein, Hackettstown, N.J.

[73] Assignee: Bio-Enhancement Systems, Corp., Morris Palins, N.J.

[21] Appl. No.: 08/713,073

[22] Filed: Sep. 12, 1996

[51] Int. Cl.[6] ........................................... A01K 1/10
[52] U.S. Cl. .............. 119/51.02; 119/719; 119/908; 119/174
[58] Field of Search ................. 119/908, 174, 119/51.02, 720, 721, 719, 859; 340/573

[56] References Cited

U.S. PATENT DOCUMENTS

| | | | |
|---|---|---|---|
| 3,541,995 | 11/1970 | Fathauer | 119/51.02 |
| 3,897,753 | 8/1975 | Lee et al. | 119/51.02 |
| 4,049,950 | 9/1977 | Byrne et al. | 119/51.02 |
| 4,262,632 | 4/1981 | Hanton et al. | 119/51.02 |
| 4,279,219 | 7/1981 | Brooks | 119/51.02 |
| 4,399,821 | 8/1983 | Bowers | 340/573 |
| 4,517,923 | 5/1985 | Palmer | 119/51.02 |
| 4,918,425 | 4/1990 | Greenberg et al. | 340/573 |
| 5,629,678 | 5/1997 | Gargano et al. | 340/573 |

FOREIGN PATENT DOCUMENTS

| | | | |
|---|---|---|---|
| 628860 | 10/1978 | U.S.S.R. | 119/51.02 |
| 2223924 | 4/1990 | United Kingdom | 119/51.02 |
| 8401688 | 5/1984 | WIPO | 119/51.02 |

*Primary Examiner*—Todd E. Manahan
*Assistant Examiner*—Eduardo C. Robert
*Attorney, Agent, or Firm*—Sixbey, Friedman, Leedom & Ferguson; Frank P. Presta; Joseph S. Presta

[57] ABSTRACT

A communications system permits animal carried transponders, such as ear tag transponders, to be selectively addressed and detected when an animal is proximate to an unterminated wire. Addresses impressed on a frequency carrier on the unterminated wire are coupled to an animal's transponder using a near field coupling, such as an electrical field coupling. When an animal's address is detected, the animal's transponder responds with a data stream carrying a tone or with a signal of different frequency coupled to the unterminated wire. Coupling is enhanced by connecting signals to be transmitted and a receiver for signals to be received to the animal's body. The unterminated wire can be positioned along a feeding/water trough in an agricultural environment to detect when a particular animal feeds or around a gate to detect when an animal passes through the gate.

17 Claims, 20 Drawing Sheets

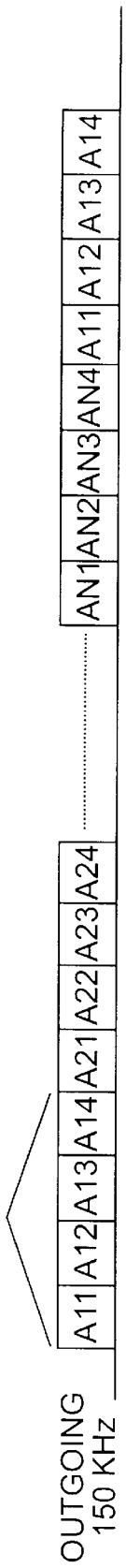
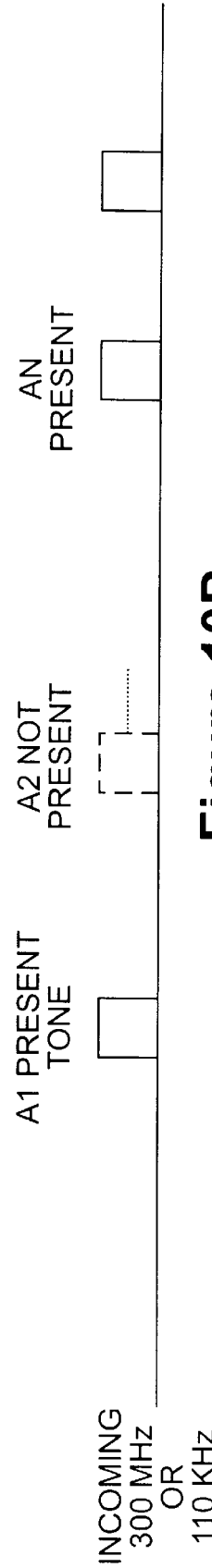
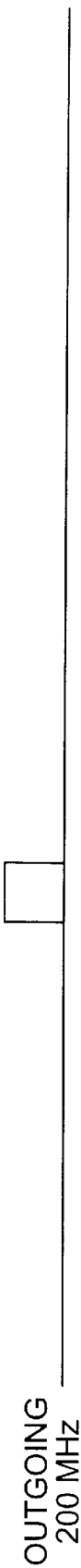
Figure 10A
Figure 10B
Figure 10C

Figure 11

| ANIMAL (ADDRESS) | EVENT | DATE | TIME | STIMULATION PRESSURE | STIMULATION SCHEDULE | | | | | OTHER |
|---|---|---|---|---|---|---|---|---|---|---|
| | | | | | ON 1 | OFF 1 | ON 2 | OFF 2 | ON N | OFF N | |
| RECORDS ............ | | | | | | | | | | |

1100 — ANIMAL (ADDRESS)
1110 — EVENT
1120 — DATE
1130 — TIME
1140 — STIMULATION PRESSURE
1150 — STIMULATION SCHEDULE
1160 — OTHER

Figure 12

| ANIMAL NUMBER OR NAME | ADDRESS | ANIMAL TYPE | DATE ACQUIRED | OTHER |
|---|---|---|---|---|
| RECORDS ............ | | | | |

1200 — ANIMAL NUMBER OR NAME
1210 — ADDRESS
1220 — ANIMAL TYPE
1230 — DATE ACQUIRED
1240 — OTHER

COMMUNICATIONS SYSTEM FOR MONITORING THE PRESENCE OF ANIMALS IN A NATURAL FEEDING ENVIRONMENT

TECHNICAL FIELD

The invention relates to communications systems and more particularly to communication systems used to identify and monitor animals.

BACKGROUND ART

U.S. Pat. No. 5,205,238 to Boice discloses techniques for applying controlled stress to animals which results in enhanced eating, drinking, mating or similar behavior. Apparatus mounts on a body part of an animal, such as the tail, and contains a mechanism for applying variable stress to the body part and a mechanism for automatically controlling the variation of stress. The apparatus includes an electronic timing circuit, such as a microprocessor, which is capable of automatically controlling the pressure applied to the animal (and the resulting stress) and is programmable to vary the pressure over time. The amount of pressure applied can be programmed to change with time. Such a device will be called herein an ABM device.

U.S. Pat. No. 4,517,563 to DIAMANT discloses an active transponder that is mounted on an object to be identified. The passive transponder is designed to be attached around an animal's neck, or alternatively by a tag fixedly attached onto the side of the ear. An active transponder is located at a fixed location and energy from the active transponder activates the passive transponder to generate a response.

U.S. Pat. No. 4,535,557 to PORCHER discloses a label for the identification of an object, in particular an ear clip for marking cattle. A portable electronic device is used to obtain the information on the label when it is touched by a special glove.

U.S. Pat. Nos. 4,612,877 and 4,718,374 to HAYES disclose an eartag comprising an identification member and an attachment member located in front of an animal's ear. An electronic signal receiving device is mounted near water bowls or the like to identify each animal in a stall from the signal sent by the ear tag.

U.S. Pat. No. 4,617,876 to HAYES discloses an animal identification and control system comprising an identification tag on the animal having a signal sending device for sending a code signal to a signal receiving device near a water bowl or the like. An animal may be automatically weighed while drinking from the water bowl.

U.S. Pat. No. 4,854,328 to POLLACK discloses an animal monitoring system and more particularly relates to a telltale sensing and transmitting device. The receiver is secured to an eartag or the like to provide an audio and/or visual indication of an elevated temperature. The transmitter is inserted in the animal subcutaneously or in a body cavity to sense body temperature.

U.S. Pat. No. 5,028,918 to GILES discloses a transponder used to identify livestock or the like using radio wave transmissions. The transponder can also be used to monitor functions of the animal such as feeding, body temperature and milk production.

U.S. Pat. No. 5,105,763 to POIESZ discloses a method of identifying an animal from a distance by a miniature responder in the form of an injectable capsule implanted subcutaneously and laterally at the front part of the head.

U.S. Pat. No. 5,309,864 to HARMSEN discloses a method and apparatus for feeding animals. A transmitter/receiver on the feeding station generates an electromagnetic interrogation field and receives the unique code from each animal and transmits this identification to a computer which operates the feeding station to deposit additional feed depending on an animal's code.

U.S. Pat. No. 5,320,067 to LEGRAIN discloses an individual animal identification system in a feeding station. A collar on the animal closes a detection circuit in the station to identify the animal.

U.S. Pat. No. 5,322,034 to WILLHAM discloses an electronic livestock record system that stores the individual animal's identification and performance data on a programmable electronic identification and data storage module carried with the animal. A reading and recording device communicates with the module.

U.S. Pat. No. 5,461,807 to JOHNSON discloses an animal eartag that houses a passive electronic transponder for use in the identification of the animal by a low frequency radio wave reading system.

U.S. Pat. No. 5,526,772 to CURKENDALL discloses a method of electronic identification of bovine animals and other species by an implanted electronic transponder in the leg of the animal. Data representative of the animal's identity and characteristics such as temperature, activity, ownership or the like can be monitored and recorded.

The ARRL Antenna Book, 10th edition, copyright 1964 by the American Radio Relay League, Inc. of Newington, Conn., pp. 186–188, contains a discussion of multiband antennas including directly fed antennas and end fed antennas. These are principally directed at operation in a band of frequencies such as those between 3.5 and 30 megahertz.

The Problems:

One problem with the Boice patent, described above, is that it uses a timed response which is predetermined. It would be desirable to apply stimulation to an animal when the animal is actually eating.

In the prior art it is known to use a feeding box in which an animal approaches, breaks a photoelectric beam and its identity is interrogated. Such a system typically uses a single interrogation-response system per box. The cattle have to be trained to walk into the box in order to get food and, if multiple animals are involved, there may be competition for access to the box which creates an unnatural feeding environment. This makes the results of research conducted using such an arrangement suspect. Accordingly, it would be desirable to monitor the feeding habits of animals under natural conditions such as those found in a loose barn environment.

Another problem with the prior art ABM device is that application of pressure to the animal requires energy. Applying stimulation to the animal at times when it is not needed wastes energy and causes depletion of energy for running the ABM unit.

Some prior art techniques utilize RF energy for communicating between an animal and a sensor. RF energy radiates and propagates for long distances and can be a source of interference. In addition, the use of RF is erratic in some environments.

Prior art systems required a long time to detect a change in the eating habits of an animal which might result from a new diet, from medication or from sickness. When monitoring weight gain or loss as often done in the prior art, it often occurred that a sick animal was not detected until after the disease had progressed to the point of untreatability.

SUMMARY OF THE INVENTION

The invention provides methods, apparatus, systems and computer program products for overcoming the problems of the prior art. A short range near field communication system is utilized to interrogate animal carried transponders, such as eartags, when the animal is in close proximity to an open feeding station, such as in a loose barn or feed lot environment. It may also be used to record the passage of animals through a gate. Computer records are maintained and analyzed to provide information about the eating habits of each animal. The near field communication system uses an unterminated wire or other unterminated conductive medium for the transmission of interrogation information to animals in proximity to the feeding trough and to receive back identification information and other information about the animal. The system permits an ABM unit to be activated when the presence of the animal is detected. In this way, the condition of entire herds of animals can be monitored and analyzed while the animals feed in a natural setting.

The problems of locating animals with respect to one or more feeding stations extends generally to proximity location. Applications of proximity location occur in the area of human health care where it is desirable to monitor patients. This monitoring extends to patients that might have difficulty reporting their own behavior such as eating or utilizing restroom facilities. It also extends to the elderly, to those who have Alzheimer's disease, are depressed, or who are subject to falls. Location monitoring tags, analogous to the eartags worn by animals as discussed above, can be attached to an identification bracelet or other form of identification worn by a patient.

In the retail industry, it is desirable to detect a situation in which products for sale are being removed from the premises without payment.

In this application, transponders incorporated in a tag, such as eartags or identification bracelets, are associated with animals, humans, or products offered for sale. For convenience, the animals, humans or products which are associated within a transponder will be referred to as "items."

The invention is directed to a method for detecting the presence of addressed items by sending one or more addresses of items on an unterminated conductive medium, and detecting a response from an item having an address sent if the item having the address sent is within a determined proximity to the unterminated conductive medium. Addressed items can be object or animals. If an animal, the response can be sent by circuitry contained within an eartag. If an animal is equipped with an ABM unit, the response can be used to activate the ABM unit. The response can include an indication that an animal is eating. This indication can be generated by voice recognition circuitry used to detect animal eating sounds. The conductive medium can be a wire, a feeding trough or any other conductive object. It is preferably not terminated by a return path to ground. The addresses sent and the corresponding responses are sent to a computer for processing over a computer interface.

Responses can be sent by a radio communications link using RF energy or over the unterminated conductive medium. The addresses are preferably send redundantly and are considered correctly received when some but less than all addresses are received correctly at the addressed item. The addresses are preferably sent using frequency shift modulation. The response can include a tone or other modulated information. If it includes a tone, the frequency of the tone can be used to indicate battery level.

The invention is also directed to apparatus for detecting the presence of items, including an address generator, a sender for sending addresses from the address generator over an conductive medium, and a receiver on the item for detecting the addresses from the conductive medium and returning a response if an item having the address sent is within an established proximity to the conductive medium. A sender sends each address redundantly and continuously and a receiver returns a response when less than all addresses are received correctly.

If the item carries an activatable mechanism, such as an ABM unit, the response may selectively cause activation of the activatable mechanism.

The invention is also directed to a system for detecting the presence of animals, and gathering and analyzing information about the animals, including a computer, a computer interface, a sender for sending address information to the animals over a communications medium and also to the computer over the interface, and a responder on at least one animal providing a response to the computer when the responder receives an address unique to the responder and the responder is within a set proximity to the communications medium. The computer activates a mechanism on the animal in response to the response.

The invention is also directed to a computer program product, including a memory medium, and a computer program, stored on the memory medium in which the computer program contains instructions for detecting a response from an addressed item if the item is within an established proximity to a medium over which addresses are sent.

The invention is also directed to a method of applying stimulation to an animal by detecting proximity of the animal to an eating area, and applying stress to the animal when the proximity of the animal is less than a given threshold.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIGS. 10A, 10B and 10C are relative timing diagrams used to illustrate the operation of the invention on different communications channels.

FIG. 11 illustrates an exemplary organization of a database containing transaction records.

FIG. 12 illustrates an exemplary organization of a database containing information on individual animals.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

Best Mode for Carrying out the Invention

Figure 1:
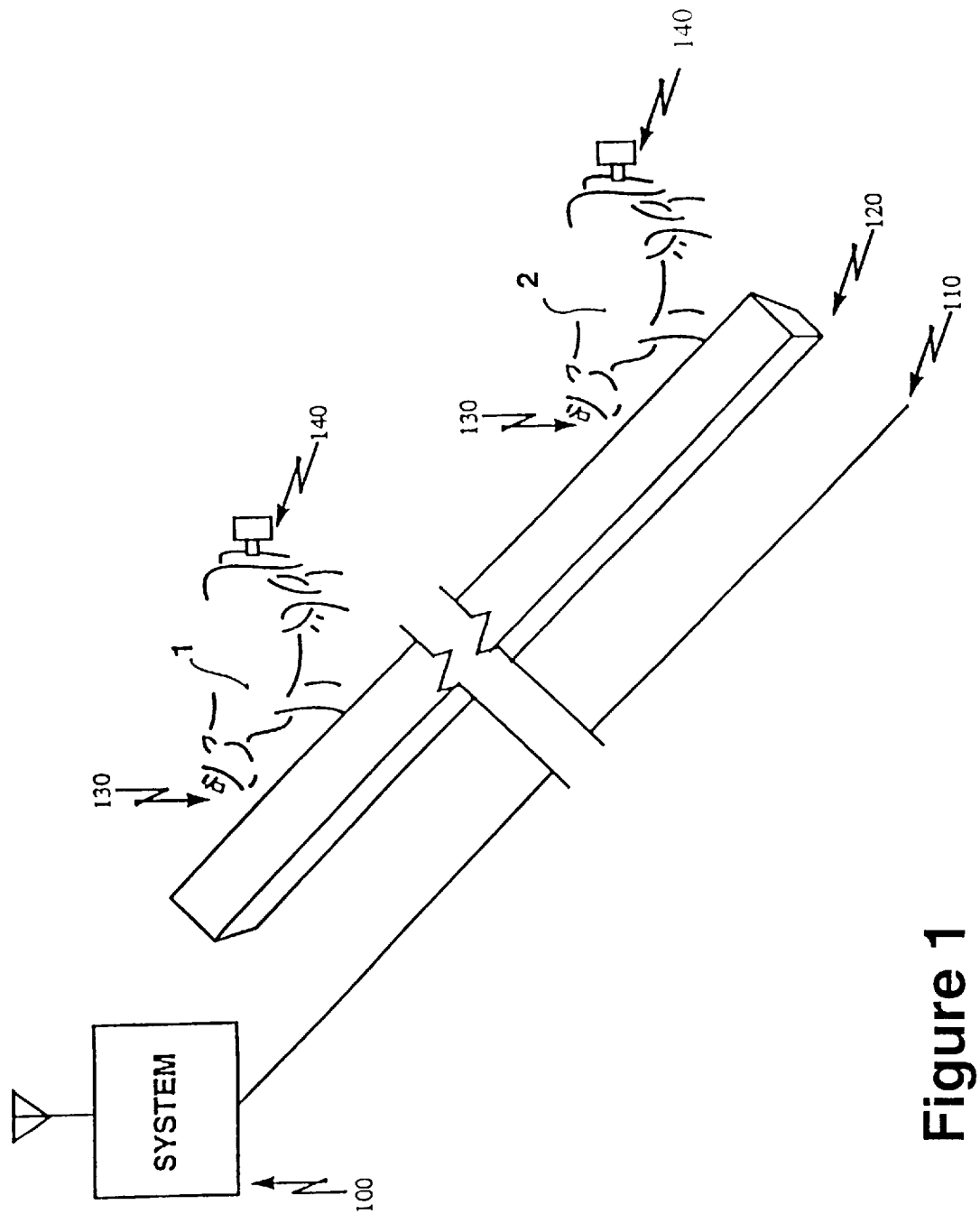
FIG. 1 illustrates an open feeding trough with the system of the invention installed to detect the feeding of an animal.

FIG. 1 illustrates an open feeding trough (120) such as might be found in a loose barn environment with the system of the invention installed to detect the feeding of an animal. Each animal 1, 2 (in the example shown, a dairy cow) is equipped with an eartag 130 which contains transponder circuitry for responding to queries. Each animal is also equipped with an ABM unit 140 mounted, in this instance, on the tail. System 100 is shown in more detail hereinafter in conjunction with FIGS. 2A and 2B. The system drives an unterminated wire 110 which runs the length of the feeding trough in an interrogation response mode which interacts with eartags 130, but only when the animal is sufficiently close to the unterminated wire 110. The system can also utilize RF to activate the ABM unit when the presence of an animal is detected at the feeding trough 120.

Figure 2A:
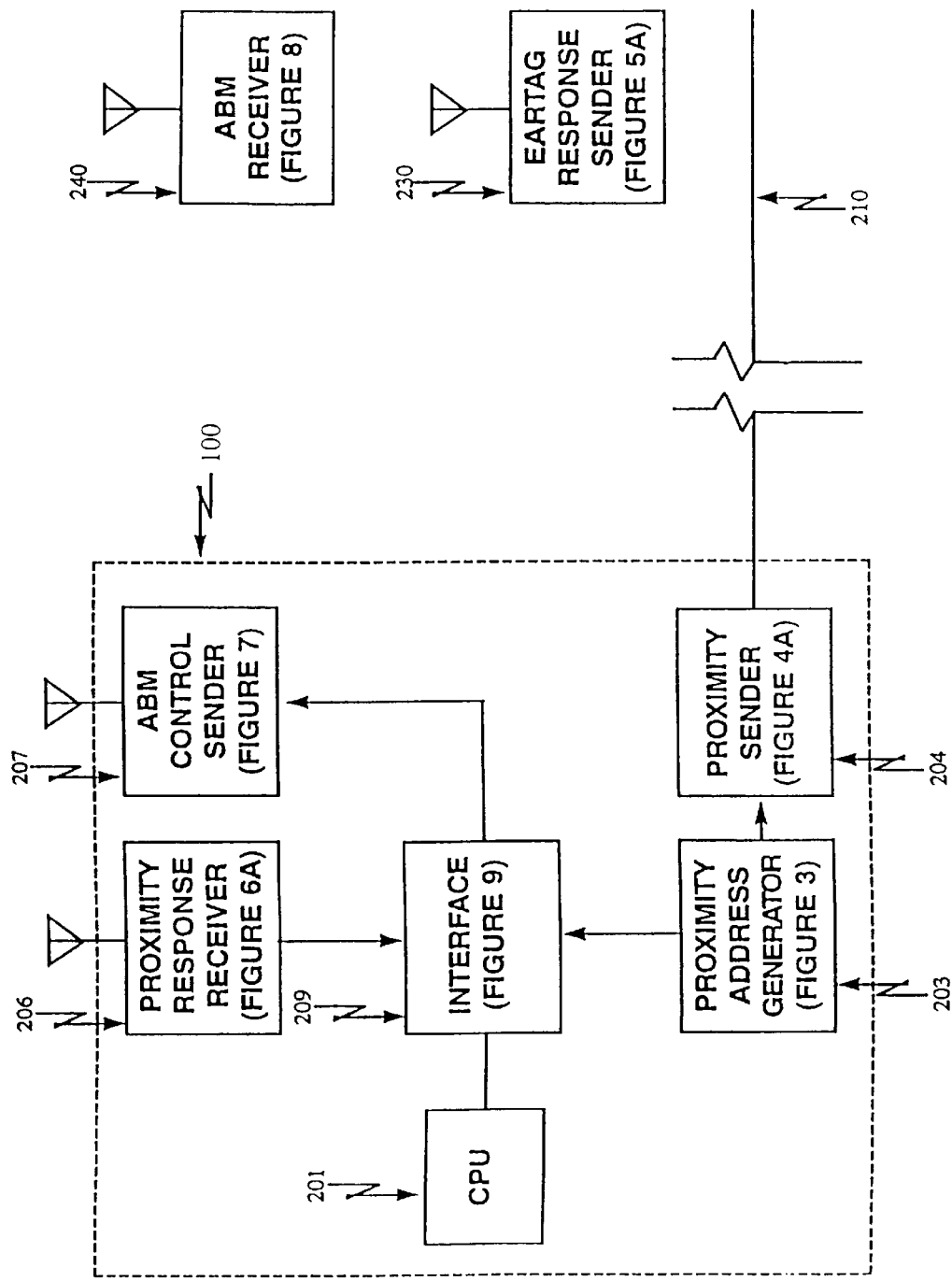
FIG. 2A is a high level block diagram of one exemplary embodiment of the invention.

FIG. 2A is a high level block diagram of one exemplary embodiment of the invention. In FIG. 2, a proximity address generator 203 feeds addressing information to a proximity sender (204) which drives a proximity sending line (sometimes called an unterminated line) 210 in a manner which will be described more hereinafter. An animal transponder, 230, such as that incorporated in the eartag of an animal detects the addressing information sent down the unterminated line and, as shown in FIG. 2A, returns an RF response which is detected by proximity response receiver 206. The address of the animal from proximity address generator 203 and the corresponding response from proximity response receiver 206 are fed to interface 209 and the information recorded in CPU 201. In the event that it is desired to provide ABM stimulation to the animal during eating, ABM control sender 207 is activated to send a command to the ABM receiver 240 over an RF link in response to detection of the presence of the animal at the trough. As noted on the figure, each of the items discussed are discussed more in detail in conjunction with later figures.

Figure 2B:
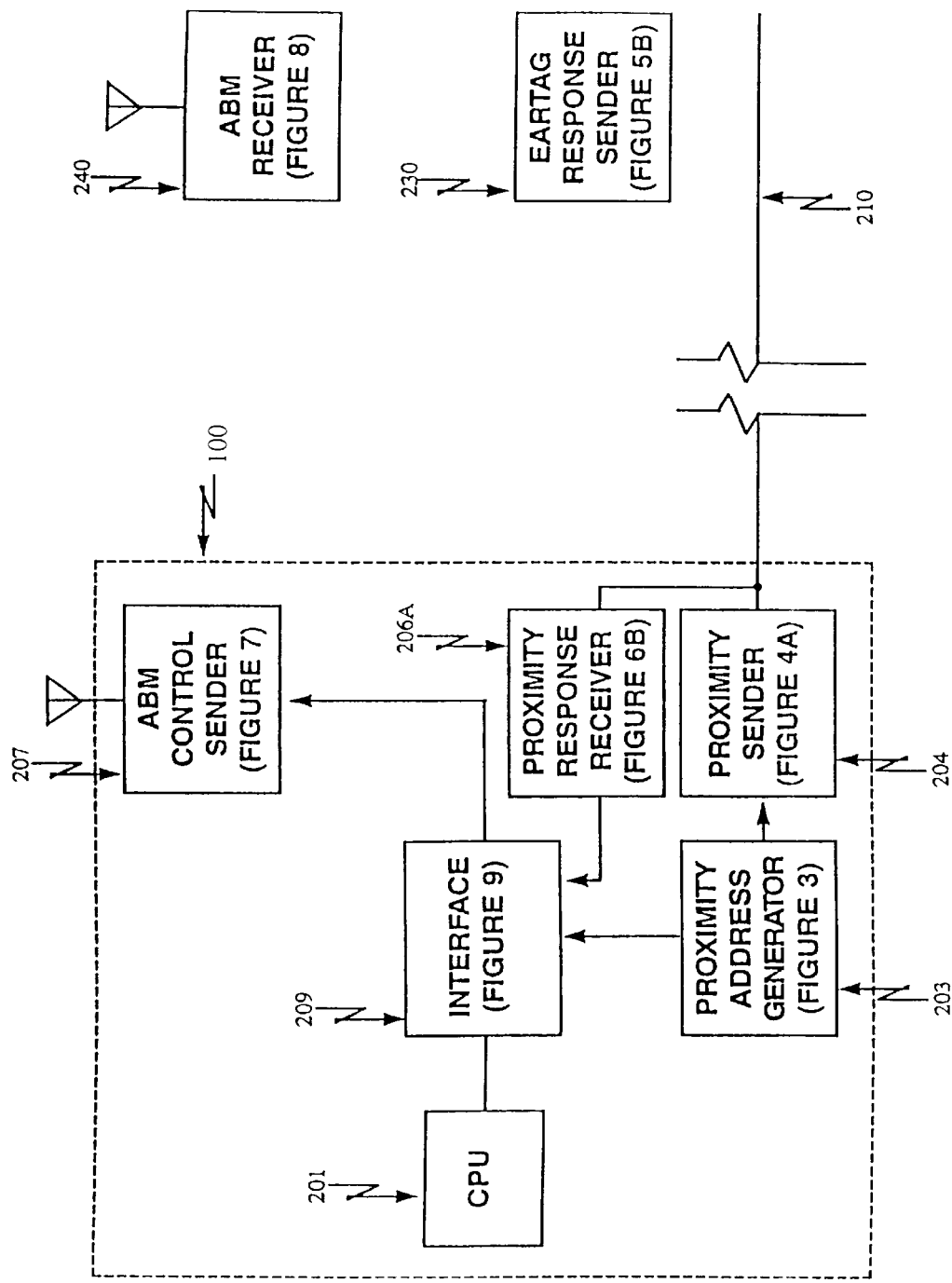
FIG. 2B is a high level block diagram of a second exemplary embodiment of the invention.

FIG. 2B is a high level block diagram of a second exemplary embodiment of the invention. The principal difference between this embodiment and that of FIG. 2A resides in the fact that the transponder response from the eartag response sender 230 is carried over the proximity sensing line 210 and detected from that line by proximity response receiver 206A. Otherwise, this figure operates as discussed in conjunction with FIG. 2A.

Figure 3:
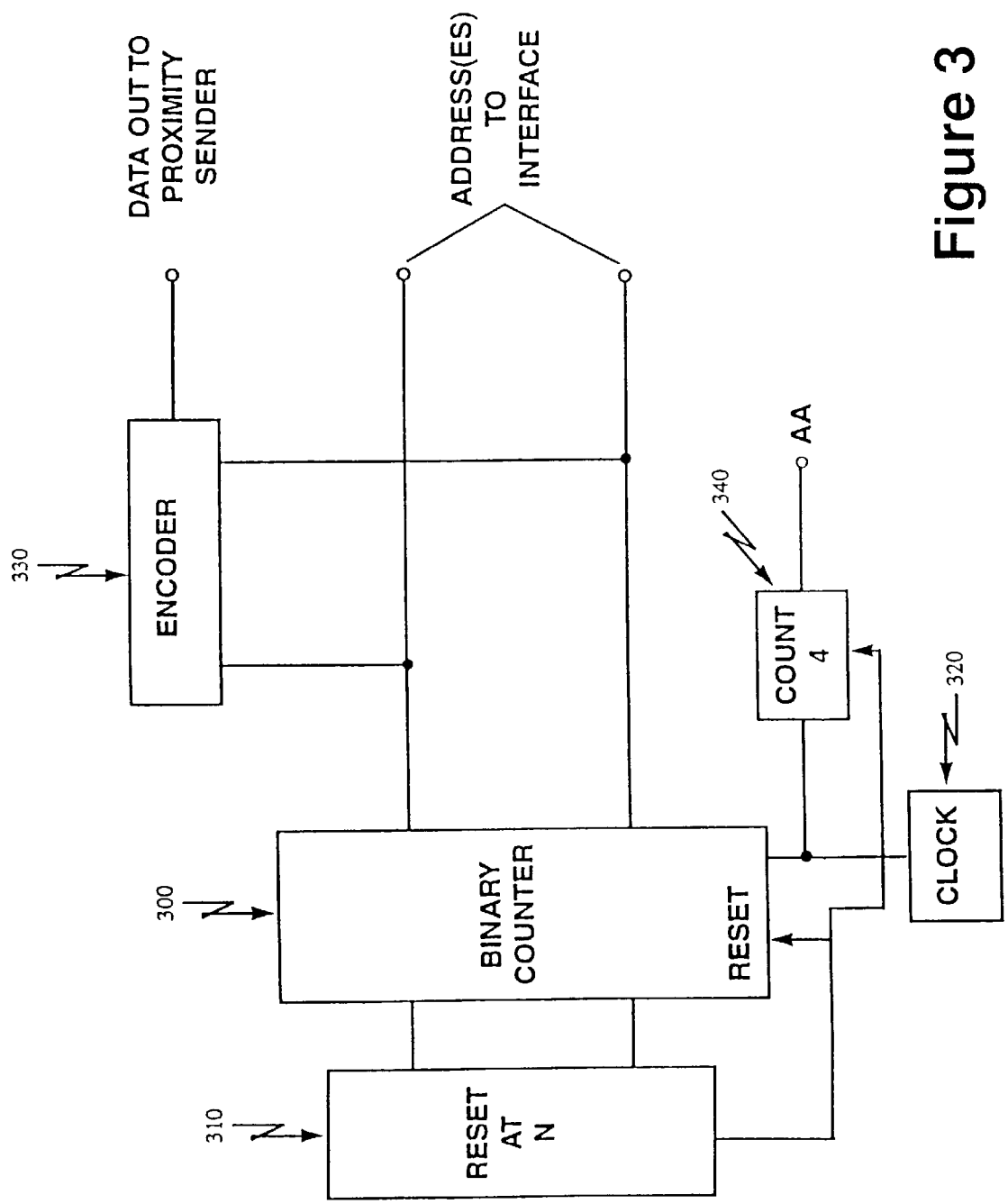
FIG. 3 is a block diagram of the proximity address generator shown in FIGS. 2A and 2B.

FIG. 3 is a block diagram of the proximity address generator shown in FIGS. 2A and 2B. A clock 320 drives a binary counter 300 in a continuously running fashion. The "reset at N" circuit 310 receives the state of the binary counter at any particular instant and is designed to trigger a reset at the highest number desired for an address. Thus, if a herd had 150 animals in it, the reset at N circuit 310 would be set to detect a binary state corresponding to 150 and when that was detected, would reset the binary counter to begin counting from 0. Thus, the number of addresses can be controlled to correspond to the number of animals being monitored. The binary counter continuously and sequentially outputs addresses for animals. These addresses are directed to the interface and to encoder 330 which provides data out to the proximity sender. Encoder 330 takes the address at its inputs from the binary counter and transmits the address four consecutive times using count circuit 340 in a serial fashion. Encoder chip 330 is preferably one commercially available for driving garage door openers and the like. It is available through RADIO SHACK stores.

Figure 4A:
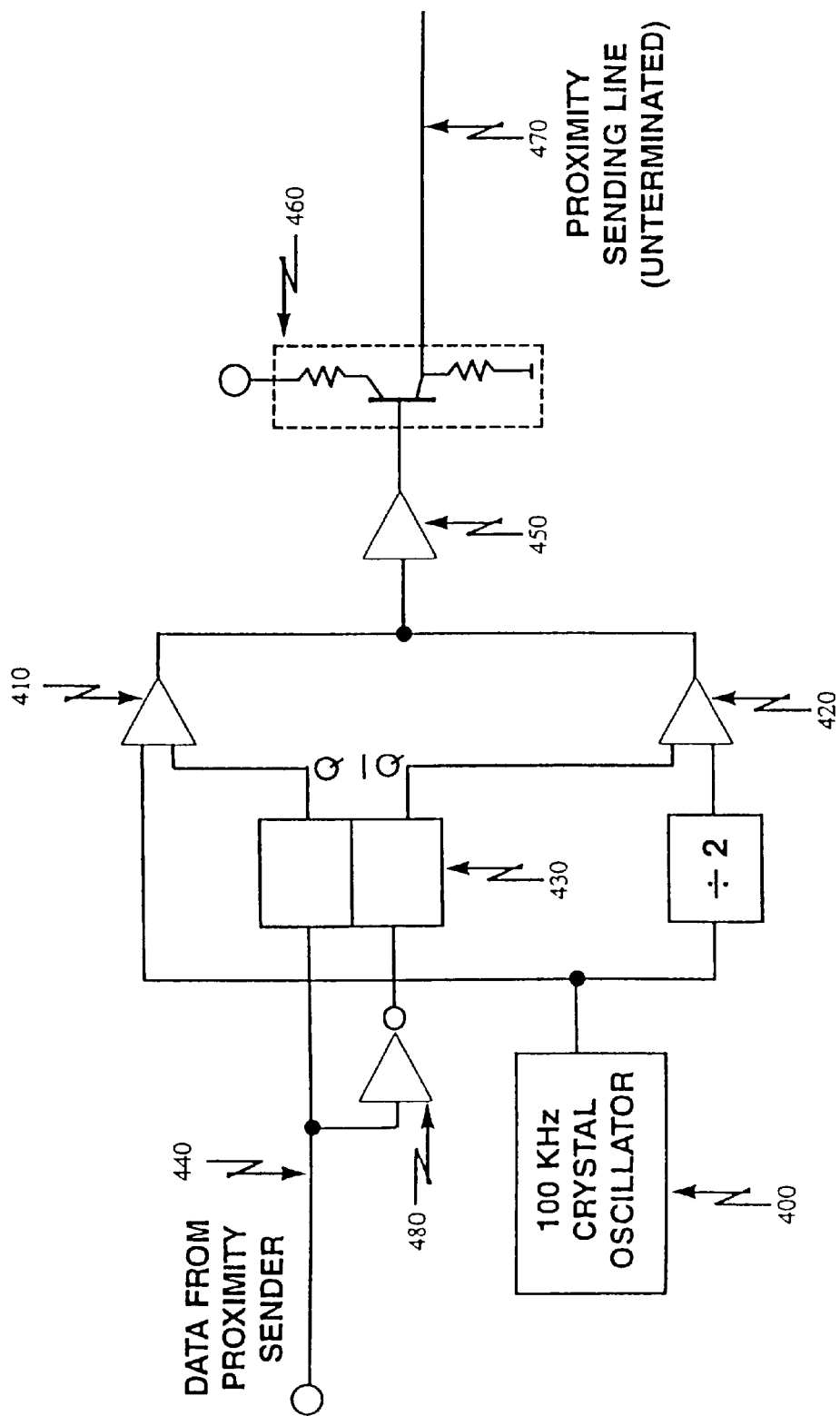
FIG. 4A is a block diagram of the proximity sender shown in FIGS. 2A and 2B.

FIG. 4A is a block diagram of the proximity sender shown in FIGS. 2A and 2B. Data from the proximity sender arrives over line 440 and is applied to flipflop 430. A free running 100 kilohertz crystal oscillator, 400, is applied to one input of gated amplifier 410. It is also divided by two and applied to one input of gated amplifier 420. Data from the proximity sender 440 causes flipflop 430 to change state as the data changes state. That is, for example, when the data from proximity sender is a logical 1 condition, the "Q" output might be logical 1 and the $\overline{Q}$ output be logical 0. On the other hand, if the input from the proximity sender is 0, the output Q will be 0 and the output $\overline{Q}$ will be 1. In this manner, the frequency applied to amplifier 450 changes depending upon the logical state of the input data from the proximity sender. Thus, the 100 kilohertz crystal oscillator is essentially frequency shift modulated between 100 kilohertz and 50 kilohertz states. This frequency modulated output is applied to driver 460 which drives the proximity sending line 470, sometimes referred to as an unterminated line.

The unterminated line is literally that. It is not terminated with a return or a path to ground. Since there is no return path, there is very little, if any, current flow on the unterminated line. However, the voltage on the line changes to track the 100 kilohertz or 50 kilohertz frequency.

Figure 4B:
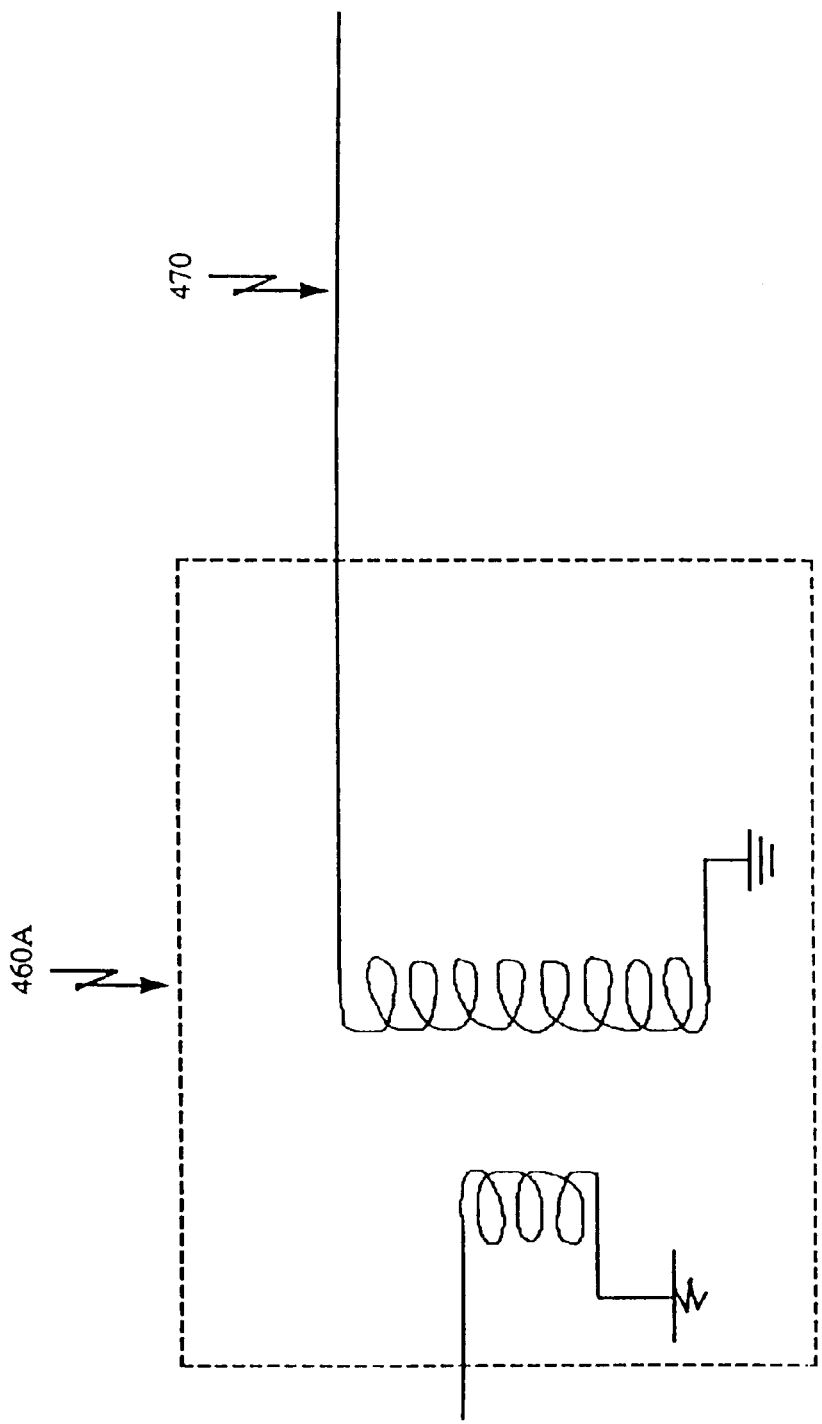
FIG. 4B illustrates an alternative for coupling of information to the proximity sending line (undeterminated line).

FIG. 4B illustrates an alternative for coupling information to the proximity sending line. This uses transformer coupling 460A which is designed to step up the voltage to be imposed on the unterminated line 470.

Figure 5A:
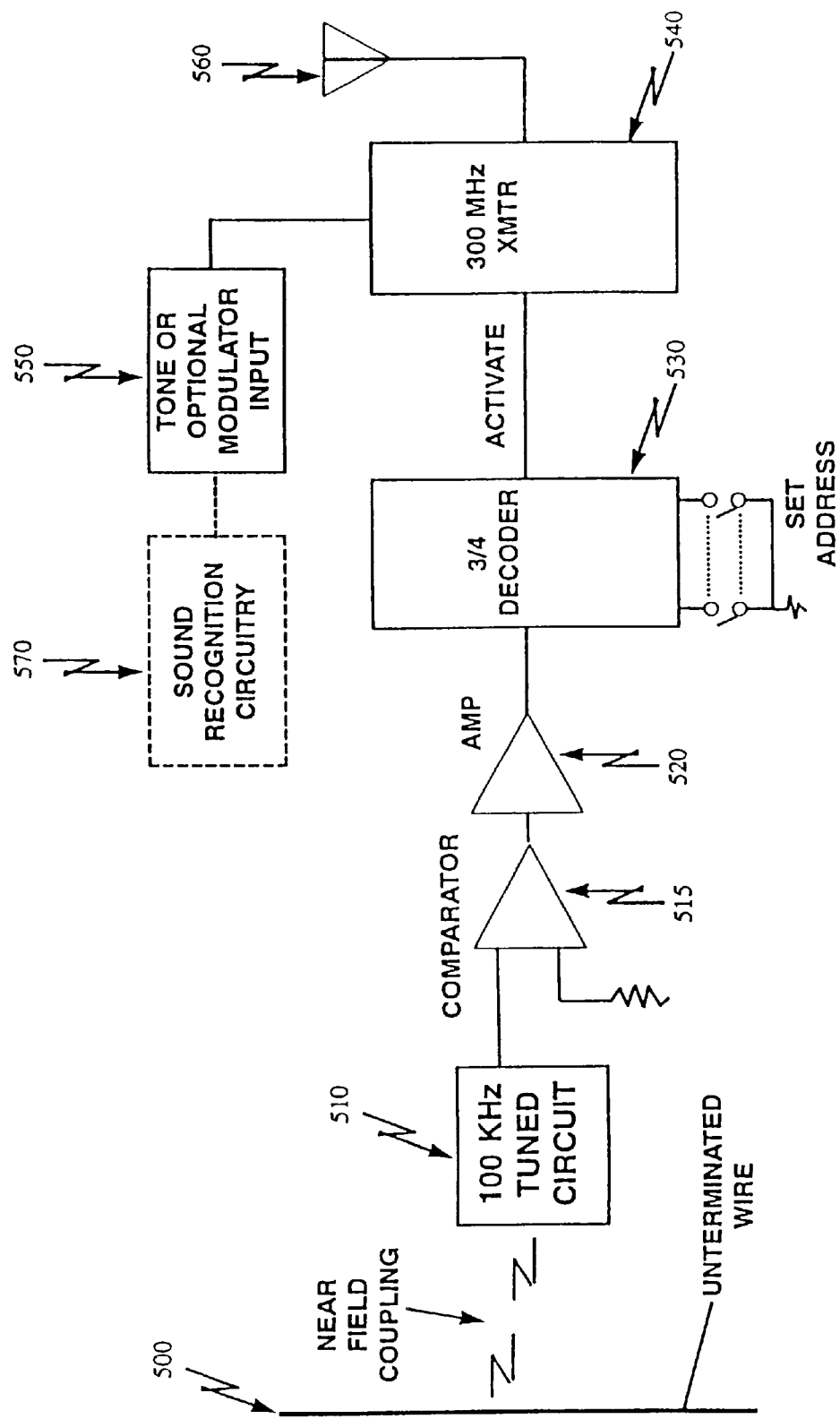
FIG. 5A is a block diagram of an eartag response sender shown in FIGS. 2A and 2B.

FIG. 5A is a block diagram of an eartag response sender shown in FIG. 2A. As an animal approaches a feeding trough, the animal also approaches the unterminated line 500. A tuned circuit in the eartag, detects the field variations resulting from information being modulated on the unterminated line as discussed above. The output of the tuned circuit 510, is applied to comparator 515 which detects when the voltage on the unterminated line is at 100 kilohertz and provides a particular output, such as logical 1. If the signal on the unterminated line is 50 kilohertz, the response of the 100 kilohertz tuned circuit 510 will be considerably reduced and fall below the threshold of the comparator 515 so that no output, that is, logical 0 will be applied to amplifier 520.

A 3 out of 4 decoder chip 530 is programmed to detect the address of the particular animal to which it is attached using, for example, switches shown at the bottom. Decoder chip 530 is the corresponding chip to encoder chip 330, shown in FIG. 3. That is, the chips are typically bought in pairs, one constituting an encoder and one constituting a decoder. The decoder chip 530 will indicate a logical 1 output when 3 out of 4 of the addresses received correspond to the set address. This output from decoder 530 is used to activate a 300 megahertz transmitter 540 which is modulated by a tone generator or optional modulator input 550.

Thus, when the animal is near the proximity wire 500, its eartag will be interrogated and the eartag will respond with a 300 megahertz transmission over antenna 560 which is modulated either with tone or with an optional modulator input. As discussed more hereinafter, the return response over antenna 560 will be detected and utilized to note the time the animal approached the feeding area.

For certain types of research, it may be desirable to distinguish between when an animal is actually eating from its mere presence at the trough. In such a case, optional sound recognition circuitry 570 can be utilized, in a manner directly analogous to voice recognition, to detect eating sounds from the animal and to send an indication to the central system that the animal is eating using either tone or other modulation output. A tone generator can also be used to determine the condition of a battery by using a voltage sensitive oscillator for the tone generator and detecting when the voltage on that tone generator drops to a certain point by detecting a change in the frequency of the oscillation.

Figure 5B:
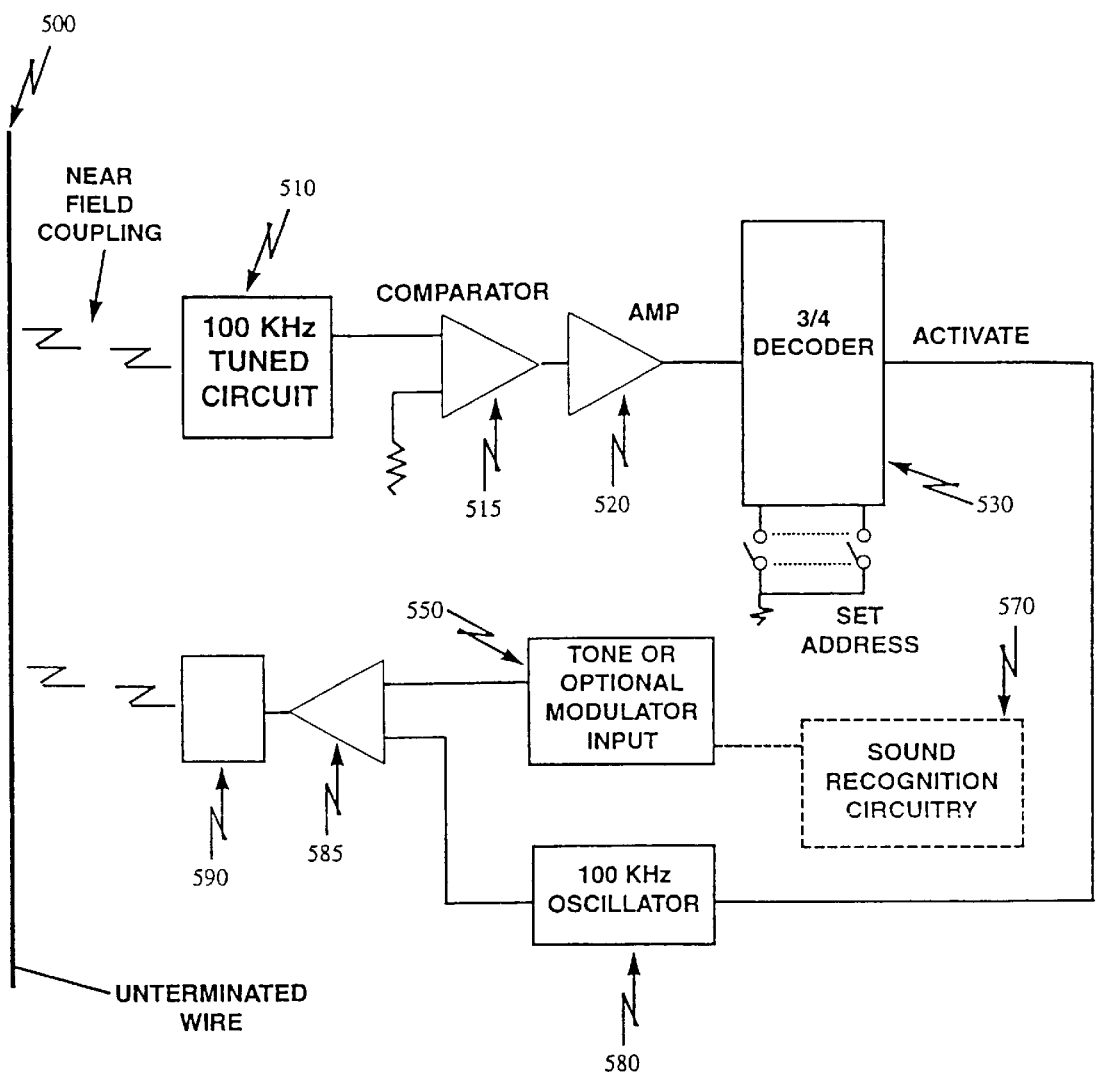
FIG. 5B is a block diagram of an alternate eartag response sender shown in FIGS. 2A and 2B.

FIG. 5B is a block diagram of alternate eartag response sender shown in FIG. 2B. This embodiment of the eartag response sender uses the unterminated line 500 to return a signal to the central system rather than using a 300 megahertz transmitter on the return path as discussed in conjunction with FIG. 5A. A 110 kilohertz oscillator 580 forms a frequency divided carrier for the return communications. That is, the uplink from the system central to the unterminated line 500 to the eartag occurs at 100 kilohertz whereas the return path occurs at 110 kilohertz. A differential amplifier 585 serves to modulate the 100 kilohertz oscillator output with the tone or optional modulator input 550. The output of the modulator is then applied to a driver 590 which induces field variations in the unterminated wire 500 through, for example, electric or magnetic coupling. The remainder of the circuitry of FIG. 5B operates as discussed in conjunction with FIG. 5A.

The near field coupling mechanism utilized and achieved by the disclosed circuitry is believed to be principally an electric field type of coupling. It is not intended to radiate radio frequency energy from the unterminated wire to the 100 kilohertz tuned circuits 510 of FIGS. 5A and 5B. For the invention, one does not want the advantages associated with far field radiation. On the other hand, the exact mechanism for the transfer of energy from the unterminated wire to the 100 kilohertz tuned circuit is not known. It is believed that that is an electric field coupling. Adjusting the voltage levels on the unterminated wire results in a very controllable field which can be adjusted precisely to a threshold distance beyond which the signal will not be received. A typical adjustment ranges might include a few inches at the low end and 15 feet at the high end. It depends on the voltage applied to the unterminated wire. RF energy, on the other hand, which is intentionally not used, would tend to propagate to much greater distances.

Figure 6A:
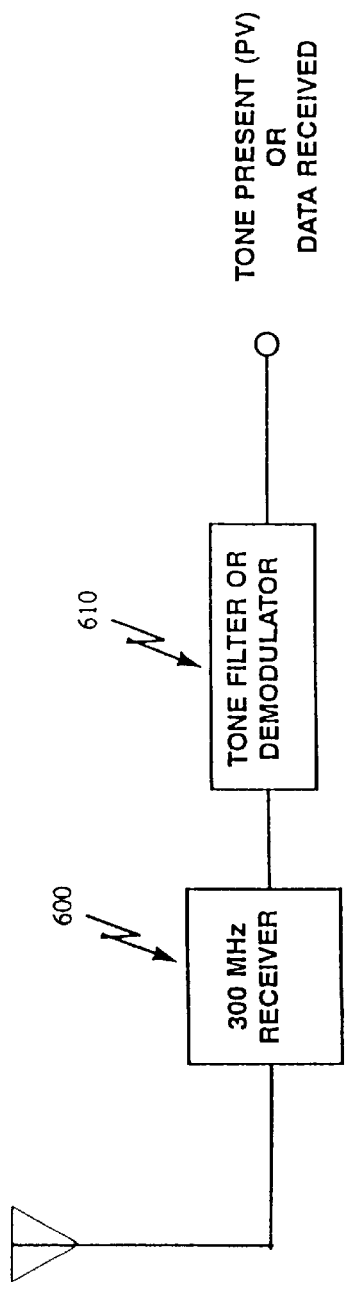
FIGS. 6A and 6B show alternative proximity response receivers for receiving signals sent by the eartag response sender shown in FIGS. 5A and 5B, respectively.
Figure 6B:
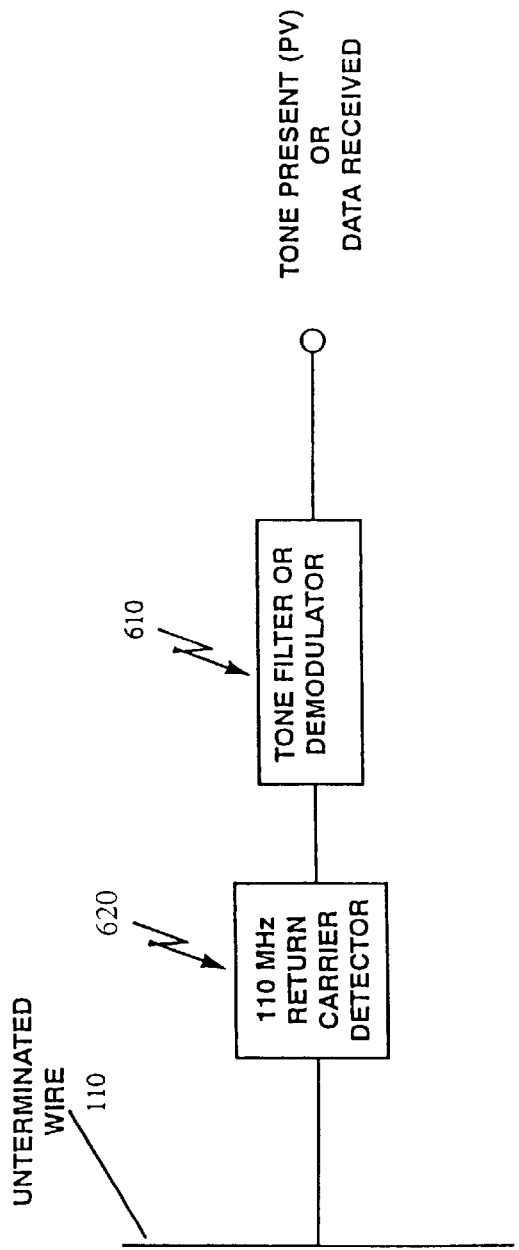

FIGS. 6A and 6B show alternative proximity response receivers for receiving signals sent by the eartag response units of FIGS. 5A and 5B, respectively.

In FIG. 6A, the proximity response receiver comprises a 300 megahertz receiver 600 which is coupled to a tone filter or demodulator 610 for detecting either the tone presence or the data received. A tone presence signal (PV) is used, as discussed more hereinafter.

In FIG. 6B, the unterminated wire 110 is monitored by 110 kilohertz return carrier detector 620 and the same tone filter or demodulator 610 is used to extract the tone present (PV) or data received output.

Figure 7:
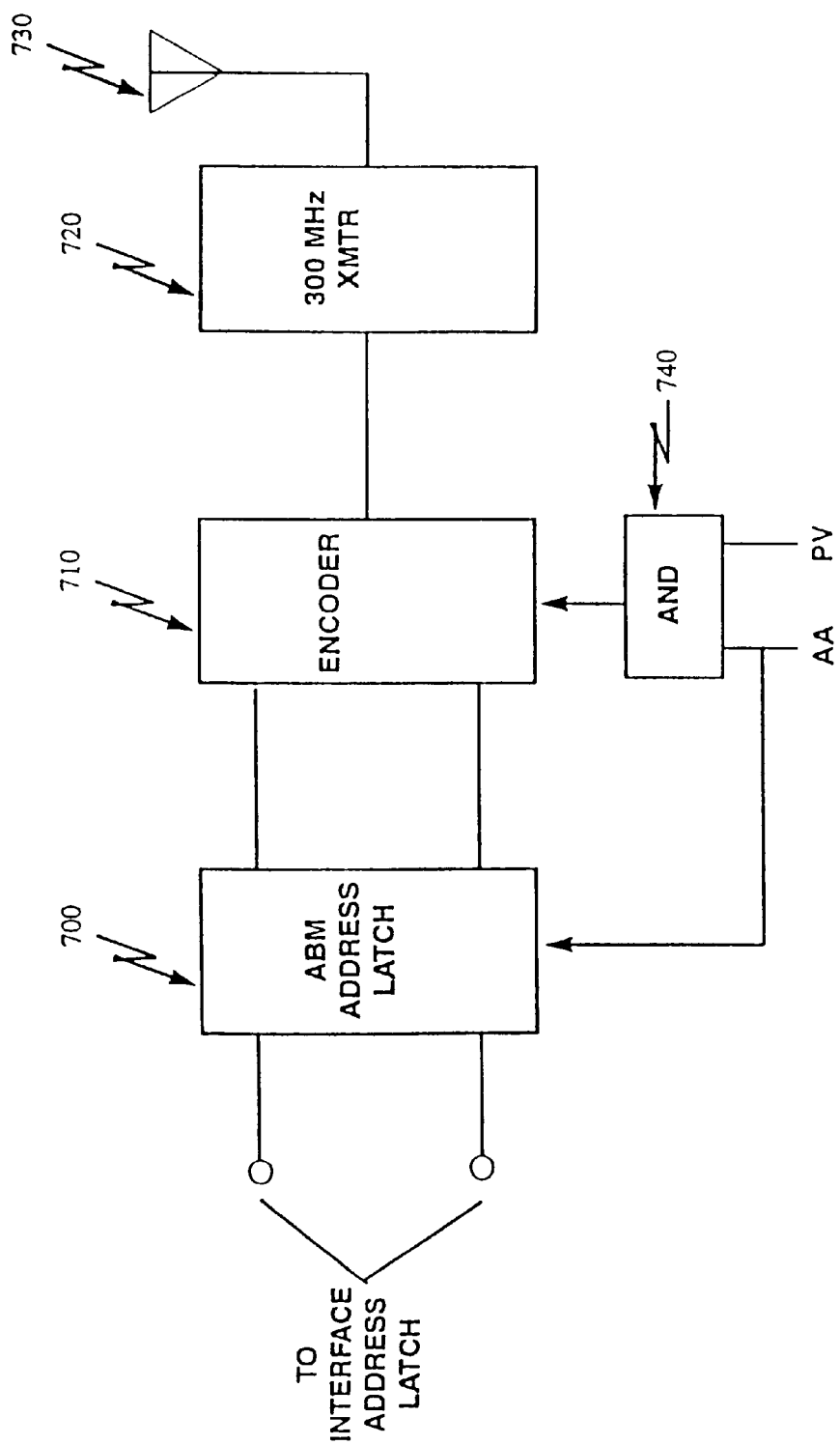
FIG. 7 is a block diagram of an ABM control sender shown in FIGS. 2A and 2B.

FIG. 7 is a block diagram of an ABM control sender shown in FIGS. 2A and 2B. The output from the interface address latch is applied to ABM address latch 700 which latches the address. The address applied to encoder 710 is sent serially over 300 megahertz transmitter 720 and antenna 730 in the manner described with reference to item 330 of FIG. 3. An address available input AA triggers the ABM address latch to latch the address and, when an animal is present as indicated by signal PV, AND gate 740 enables the transmission by encoder 710 over the 300 megahertz transmitter.

Figure 8:
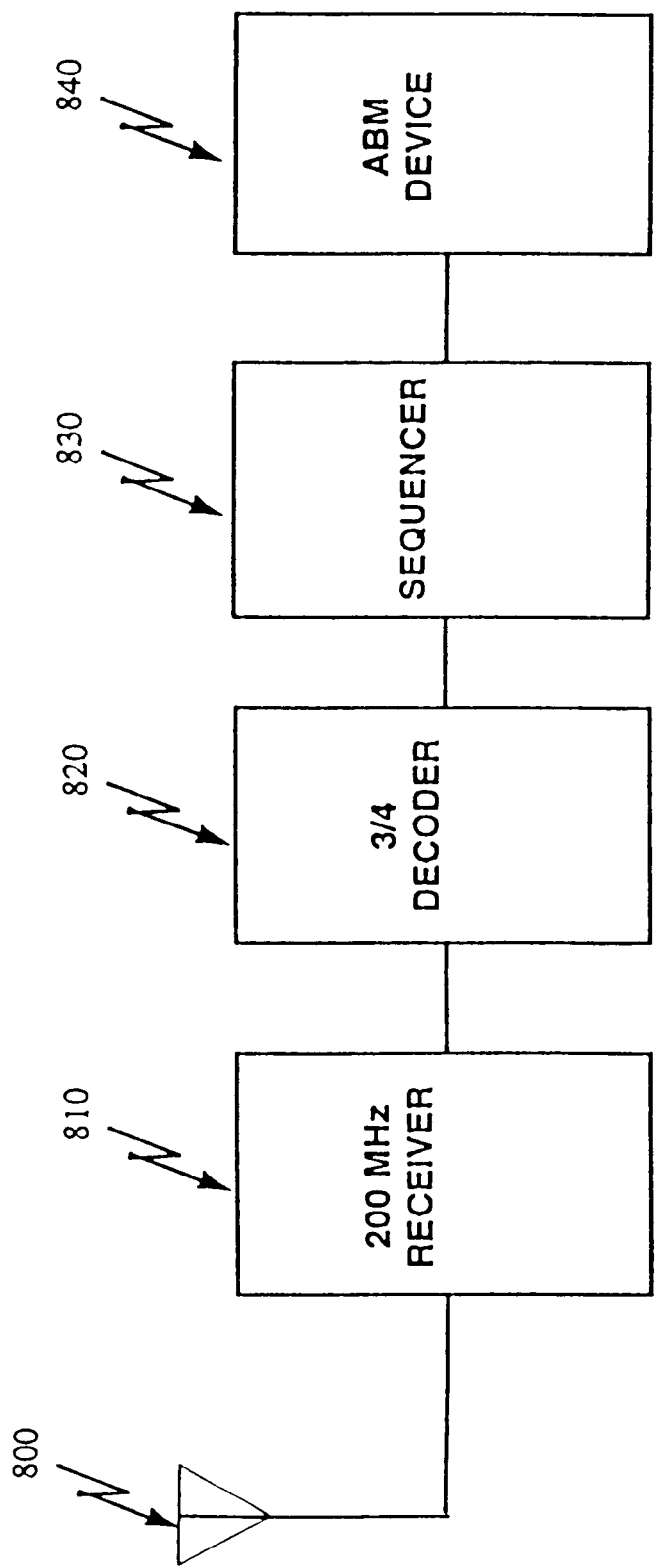
FIG. 8 is a block diagram of an ABM receiver shown in FIGS. 2A and 2B.

FIG. 8 is a block diagram of an ABM receiver shown in FIGS. 2A and 2B. Activation of the device is achieved by a 200 megahertz transmission from the central system to the ABM unit and received at antenna 800 and applied to 200 megahertz receiver 810. Item 820 decodes the address being received in the same manner discussed in conjunction with item 530 of FIG. 5A and when, the address received is the address of the animal in question, activates sequencer 830 to turn on the ABM device 840 in a programmed manner.

Figure 9:
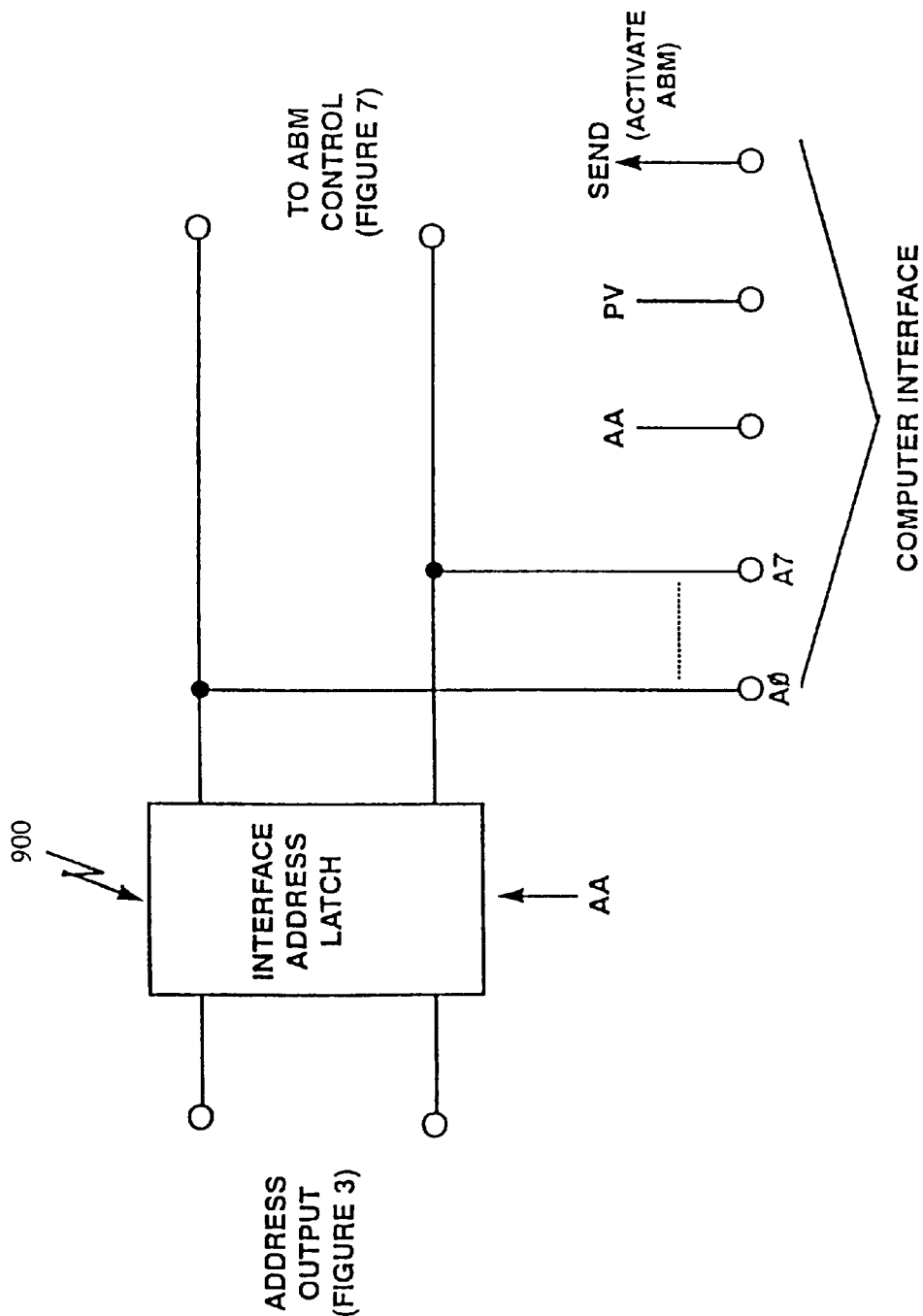
FIG. 9 is a block diagram of an interface shown in FIGS. 2A and 2B.

FIG. 9 is a block diagram of an interface shown in FIGS. 2A and 2B. An interface address latch is generated by an address available signal. The address available signal can be generated using the count 4 circuit 340 shown in FIG. 3 or can be generated directly by the computer. The output of the interface address latch 900 is sent to the ABM control unit shown in FIG. 7 and is also provided to a computer interface to permit analysis and monitoring and control to be performed by the computer. As illustrated in the example shown in FIG. 9, outputs A0–A7 constitute an address. Line AA constitutes an address available signal. Line PV indicates to the computer that an animal of a given address is present and the send line is utilized to activate the ABM in response to computer commands.

FIGS. 10A, 10B and 10C are relative timing diagrams used to illustrate the operation of the invention on different communications channels. FIG. 10A shows a sequential plurality of addresses being generated in groups of 4 each. That is, address 1 is transmitted on an outgoing 150 kilohertz (unterminated) line and is repeated 4 times before address 2 is sent. After the number of addresses determined by the reset unit 310 of FIG. 3, the sequence begins repeating. The process runs continuously. FIG. 10B shows that when an animal is present within the threshold distance of the proximity sensing line (unterminated line), the animal sends back a tone, as discussed above, on either a 300 megahertz RF carrier or on a 110 kilohertz return over the unterminated line. When an animal is present, a tone or a modulated input is returned such as shown at A1 in FIG. 10B. In the example shown in FIG. 10B, animal 2 is not present and therefore no tone pulse or other information will be sent.

FIG. 10C illustrates that when an animal is present and it is desires to activate the ABM, the ABM will be activated in response to the detection of an animal present at the feeding trough.

An exemplary use of the apparatus described heretofore will now be explained in conjunction with the remaining figures.

FIG. 11 illustrates an exemplary organization of a data base containing logging transaction records. Although the particular events which are significant in monitoring an animal may vary with the animal, and with the particular environment in which the animals are kept, this example assumes that transactions will be generated each time an animal enters zone N, each time an animal leaves zone N, each time stimulation has begun, each time stimulation has ended, when a change of diet is undertaken for a particular animal, when medication is given for a particular animal and when an animal is weighed. Preferably, this type of information is maintained in one or more databases, examples of which are now discussed.

FIG. 11 illustrates an exemplary organization of a data base containing logging transaction records. Each transaction of the type described will be entered in a transaction record. A transaction record is formatted with fields as indicated in FIG. 11. At 1100 is a field for receiving the animal identification such as the address. Field 1110 represents the type of transaction or the event which occurred. Field 1120 represents the date, and field 1130, the time at which the event at 1110 occurred. Field 1140 is utilized to record the last stimulation pressure applied to the animal and field 1150 contains a stimulation schedule including on and off dates and times at during which the stimulation should be applied. Field 1160 is field utilized to receive general textual information.

FIG. 12 illustrates an exemplary organization of a data base containing information on individual animals. Field 1200 includes the animal number or name. Field 1210 contains the address by which the control circuitry will be addressed for that animal. Field 1220 contains the animal type. Field 1230, indicates the date the animal was acquired and field 1240 permits the recordation of additional information. Note that the particular fields specified for any of the databases is somewhat driven by the application and the arrangement of fields and the selection of fields should reflect the needs of the person gathering data on the animals.

Figure 13:
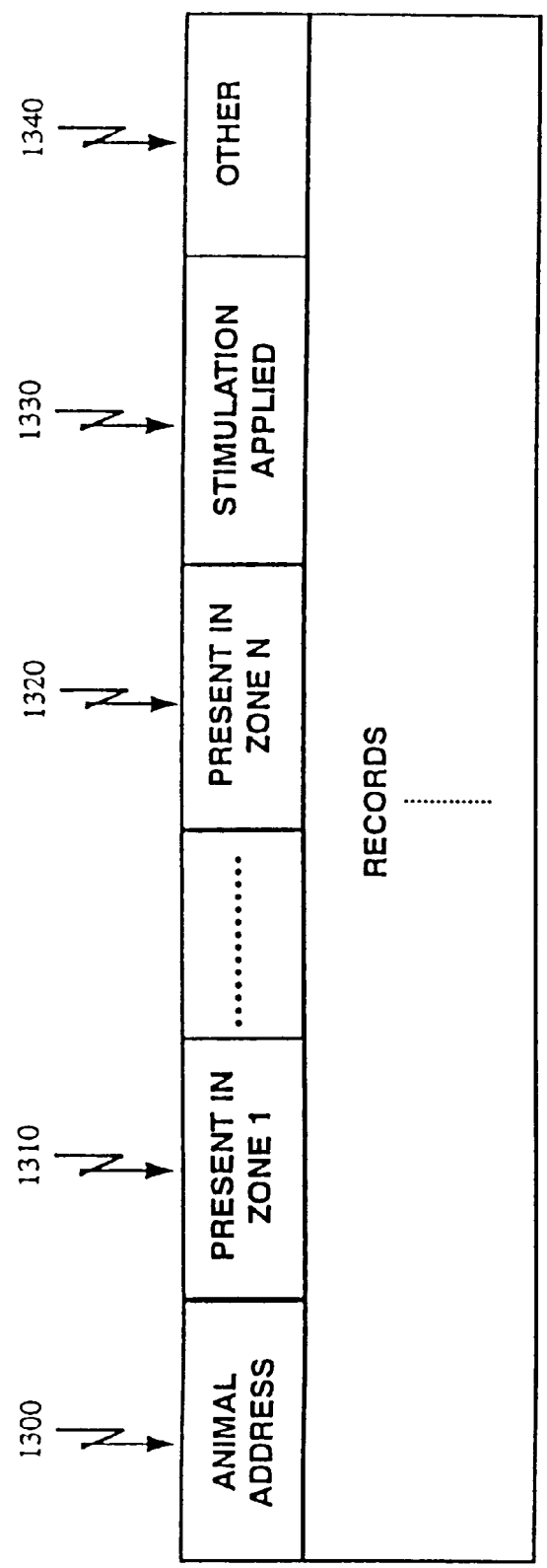
FIG. 13 illustrates an exemplary organization of a database containing information about the most recent status of an animal.

FIG. 13 illustrates an exemplary organization of a data base containing information about the most recent status of an animal. Field 1300 is the animal address. Fields 1310–1320 represent whether or not the animal was present in a particular zone at the last reading. Field 1330 describes the amount of stimulation last applied, if any, and field 1340 permits the recordation of additional information.

Figure 14:
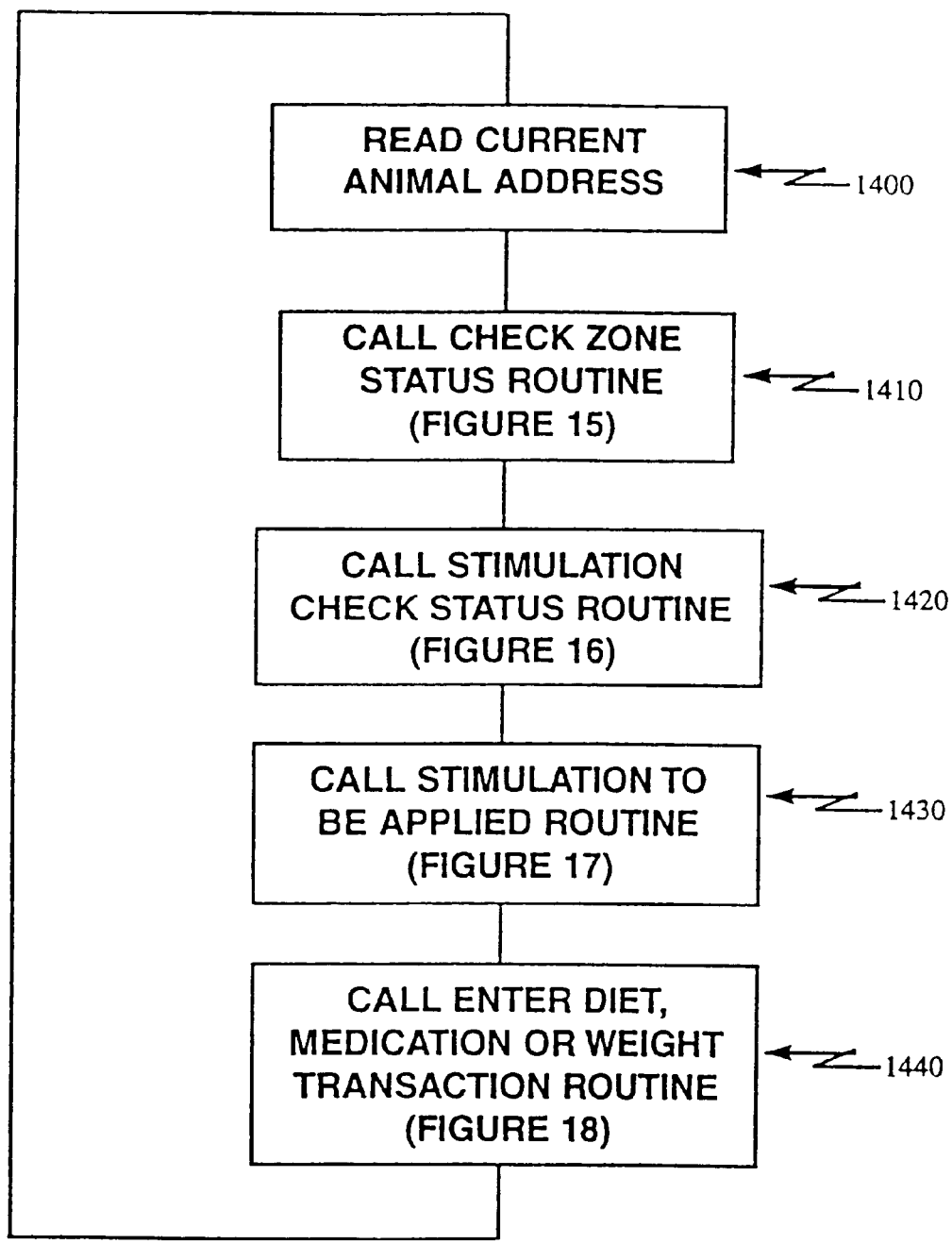
FIG. 14 is a flow chart of an exemplary process (main routine) for operating the invention.

FIG. 14 is a flow chart of an exemplary process (main routine) for controlling an exemplary implementation of the invention. The current animal address is read from the interface unit shown in FIG. 9 (1400) and a call is made to the check zone status routine (1410) shown in FIG. 15. When that process returns, a call is made to a stimulation check status routine (1420) shown in FIG. 16. When that subroutine returns, a call is made to a stimulation to be applied routine (1430) shown in FIG. 17. When that subroutine returns, a call is made to the entered diet, medication or weight transaction routine (1440) as described more in conjunction with FIG. 18.

The process then repeats in an ongoing fashion so that the main routine is continuously running during operation of the system.

Figure 15:
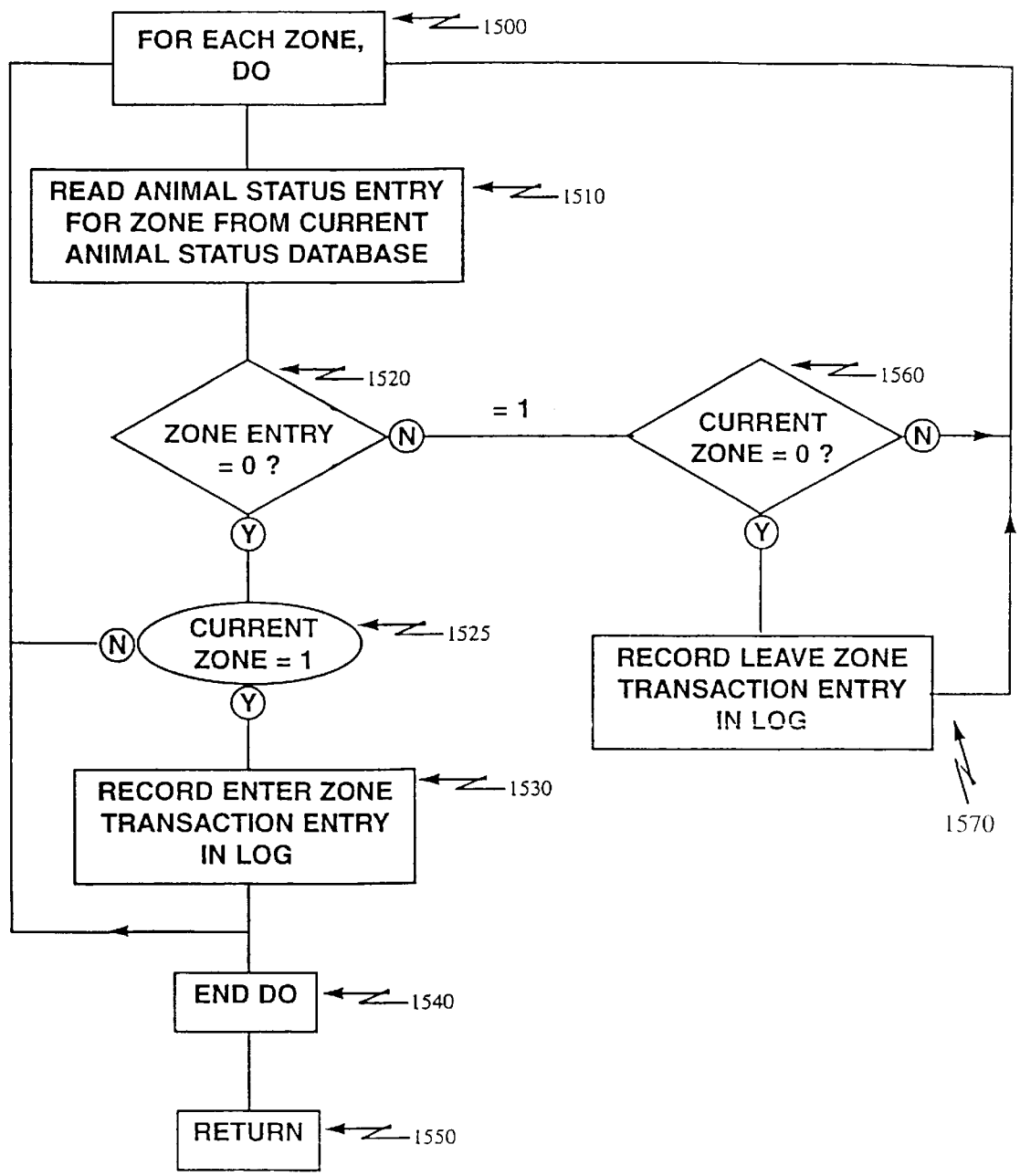
FIG. 15 is a flow chart of a check zone status routine shown in FIG. 14.

FIG. 15 is a flow chart of a check zone status routine shown in FIG. 14. It is essentially a large DO loop for considering whether or not the animal is present in a particular zone. The loop begins at 1500 and starts with reading of animal status entry 1510 for the zone from the current animal status data base described as shown, for example, in FIG. 13. If the animal was not in zone N, at the last reading (1520-Y) but is currently in zone N (1525-Y), a record enter zone transaction entry will be made in the log (1530) and the loop will continue. If the animal was previously in zone N (1520-N) and is currently not in zone N (1560-Y), a record leave zone transaction is entered in the log. If the animal was previously in zone N (1520-N) and is currently no longer is zone N (1560-N) the loop continues. After all zones have been processed and end of the do loop occurs (1540) and the subroutine returns.

Figure 16:
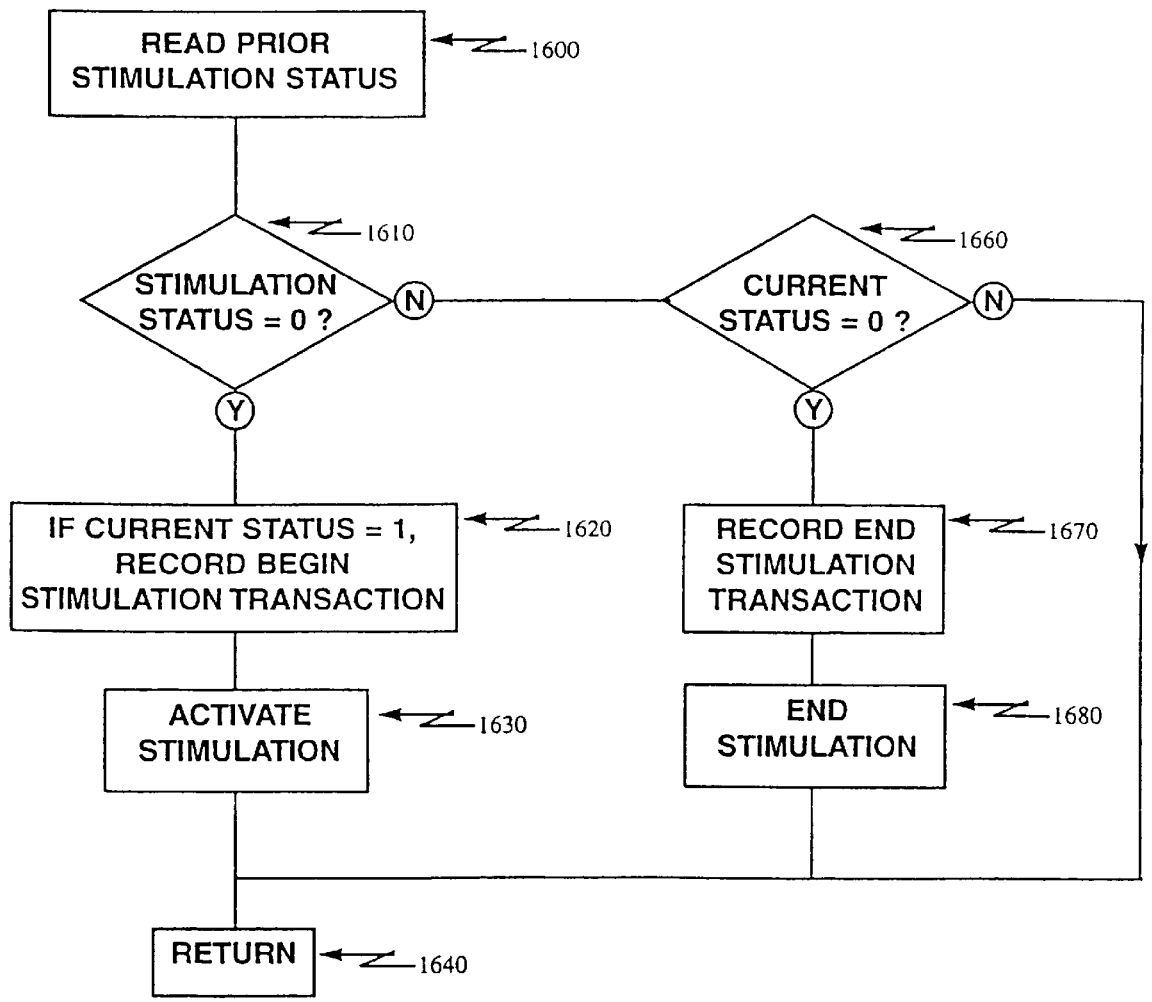
FIG. 16 is a flow chart of a stimulation check status routine shown in FIG. 14.

FIG. 16 is a flow chart of a stimulation check status routine shown in FIG. 14. FIG. 16 also represents a DO loop. For each animal, (1600), the following steps are taken. The prior stimulation status of the animal is read from the data base shown on FIG. 13 (1605) and if the animal was previously not being stimulated (1610-Y) and the animal is currently being stimulated (current status=1) a begin stimulation transaction is entered and the animal's ABM unit is activated to stimulate it (1630). If the animal was previously being stimulated (1610-N) and the animal is currently no longer being stimulated (1660-Y) an end stimulation transaction record is generated (1670) and the stimulation is terminated (1680). If the animal was being stimulated (1610-N), and the animal continues to be stimulated (current status=1; 1660-Y) the DO loop continues. After checking each animal the DO loop ends (1640) and the subroutine returns (1650).

Figure 17:
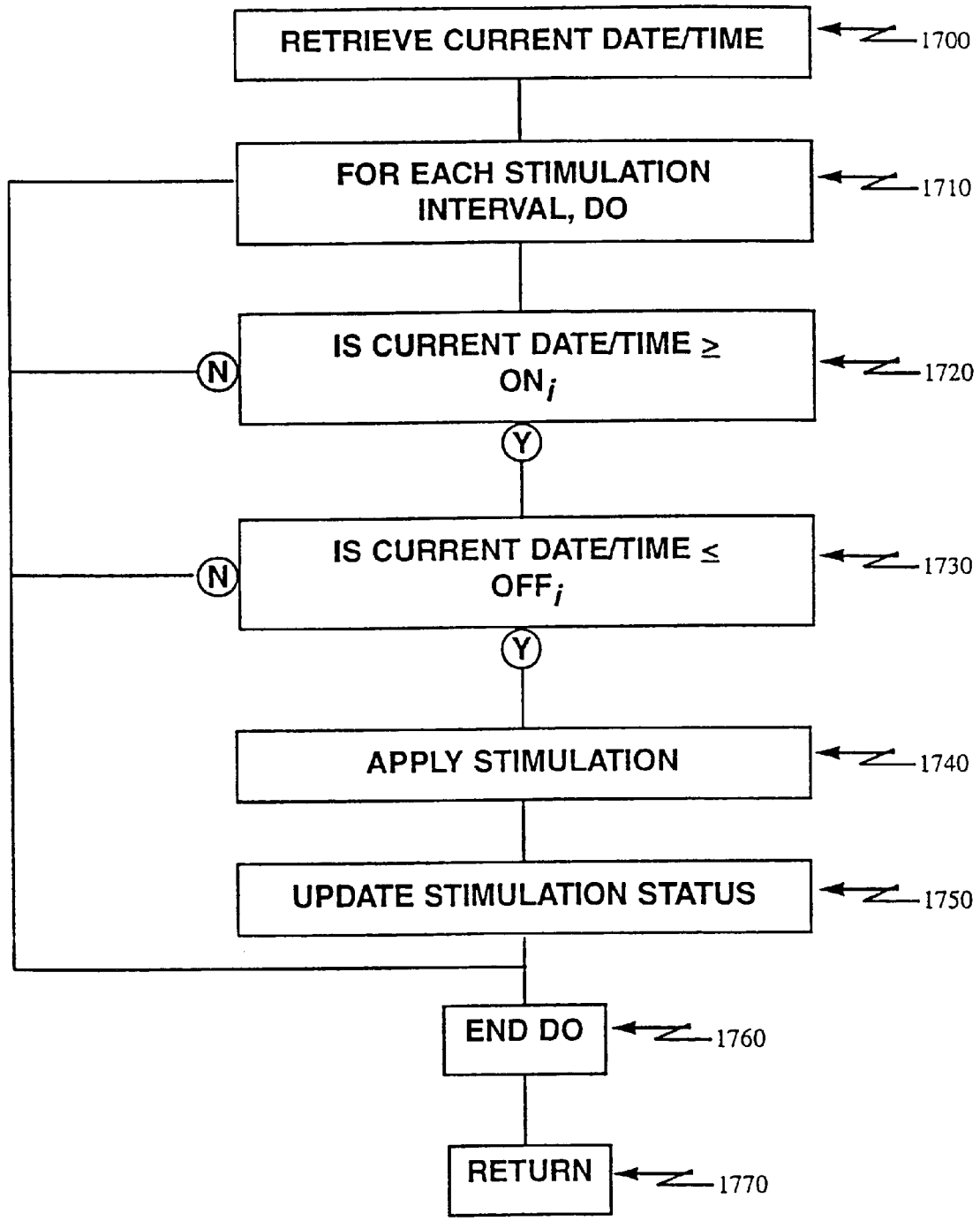
FIG. 17 is a flow chart of a stimulation to be applied routine shown in FIG. 14.

FIG. 17 is a flow chart of a stimulation to be applied routine shown in FIG. 14. The current date/time is checked (1700) and for each stimulation interval, a DO loop is begun (1710). The do loop checks to see if the current date time is within a stimulation interval specified in FIG. 11. If the current time is within the interval, then stimulation should be applied to the animal (1740) and the stimulation status updated (1750). When all stimulation intervals have been checked, the DO loop ends (760) and the sub routine returns (1770).

Figure 18:
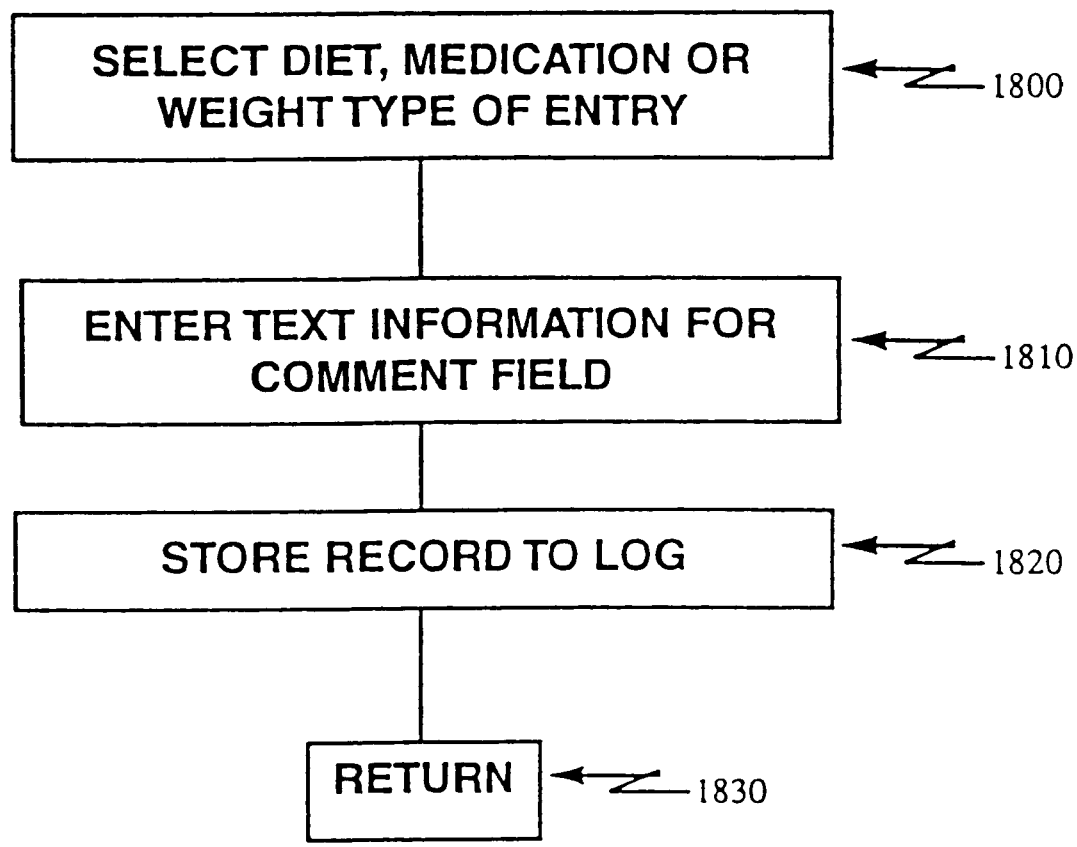
FIG. 18 is a flow chart of an enter diet, medication or weight routine, shown in FIG. 14.

FIG. 18 is a flow chart of an entered diet, medication or weight routine shown in FIG. 14. A selection of the type of entry is made first (1800), that is, whether diet, medication or weight information is to be entered. If it is, the text information is entered in the comment field for that record (1820). Once the information has been entered, it is stored as a record in the transaction log in data base (1830) such as that of FIG. 11. Then the process returns (1840).

In this way, hardware and software are combined to achieve superior monitoring of animal behavior which overcomes the problems of the prior art. The computer may be configured, for example, to calculate the number of visits to a feeding station in a 24 hour period, or to calculate feed consumption of an animal by the difference in feed weight which occurs between the time in which the animal enters a feeding station and the time when the animal leaves the feeding station.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. A system for detecting the presence of animals, and gathering and analyzing information about said animals, comprising:
   a. a computer;
   b. a computer interface;
   c. a sender for sending address information to said animals over an unterminated conductive medium and also to said computer over said interface; and
   d. a responder on at least one animal providing a response to said computer when the responder receives an address and said responder is within a set proximity to said communications medium.

2. The system of claim 1, in which said computer activates a mechanism on said animal in response to said response.

3. The system of claim 1, in which said computer is configured to calculate the duration of time an animal is present at a feeding station.

4. The system of claim 1, in which said computer is configured to determine how long an animal is actually feeding.

5. The system of claim 1, in which the computer is configured to determine the number of visits to a feeding station by an animal.

6. The system of claim 5, in which the computer is configured to calculate the number of visits to a feeding station in a 24 hour period.

7. The system of claim 1, in which this computer is configured to calculate the feed consumption of an animal by the difference in feed weight which occurs between the time in which the animal enters a feeding station and the time when the animal leaves the feeding station.

8. The system of claim 1, wherein said responder provides said response when said responder receives an address unique to said responder.

9. A method for proximity detecting the presence of tagged animals comprising the steps of:
   a. sending one or more addresses of animals on an unterminated conductive medium; and
   b. detecting a response from a tag associated with an animal having an address sent if the tag having the address sent is within a predetermined proximity to said unterminated conductive medium.

10. The method of claim 9 in which said response is sent by an eartag response sender.

11. The method of claim 9, wherein said animal is equipped with an ABM unit and in which said response causes activation of said ABM unit.

12. The method of claim 9 in which said response includes an indication that an animal is eating.

13. The method of claim 9 in which said conductive medium is a wire.

14. The method of claim 9 in which said conductive medium is a feeding trough.

15. The method of claim 9 in which addresses and an indication of response are sent to a computer for processing.

16. The method of claim 9 in which said addresses are sent using a keyed modulation.

17. A method of applying stimulation to an animal comprising the steps of:
   a. using an unterminated conductive medium to detect proximity of said animal to an eating area; and
   b. applying stress to said animal when the detected proximity of said animal is less than a given threshold, wherein said stress is of a type which encourages said animal feed at said eating area.

* * * * *